(12) United States Patent
Williams et al.

(10) Patent No.: US 9,030,137 B2
(45) Date of Patent: May 12, 2015

(54) ELECTRIC MOTOR CONTROL

(75) Inventors: Connel Brett Williams, West Midlands (GB); Christopher David Dixon, Coventry (GB); Robert James Huxford, Birmingham (GB)

(73) Assignee: TRW Limited, West Midlands (GB)

( * ) Notice: Subject to any disclaimer, the term of this patent is extended or adjusted under 35 U.S.C. 154(b) by 175 days.

(21) Appl. No.: 13/583,770

(22) PCT Filed: Feb. 15, 2011

(86) PCT No.: PCT/GB2011/050281
§ 371 (c)(1),
(2), (4) Date: Dec. 26, 2012

(87) PCT Pub. No.: WO2011/110828
PCT Pub. Date: Sep. 15, 2011

(65) Prior Publication Data
US 2013/0134914 A1 May 30, 2013

(30) Foreign Application Priority Data

Mar. 11, 2010 (GB) .................................. 1004049.1

(51) Int. Cl.
*H02P 6/00* (2006.01)
*H02P 27/08* (2006.01)

(52) U.S. Cl.
CPC ................ *H02P 6/001* (2013.01); *H02P 6/007* (2013.01); *H02P 27/08* (2013.01)

(58) Field of Classification Search
CPC ......................................................... H02P 6/001
USPC ................................ 318/400.13, 400.01, 700
See application file for complete search history.

(56) References Cited

U.S. PATENT DOCUMENTS

| 6,172,498 B1 | 1/2001 | Schmidt et al. |
| 6,501,243 B1 * | 12/2002 | Kaneko et al. ................ 318/700 |
| 6,653,812 B1 * | 11/2003 | Huo et al. ..................... 318/801 |
| 7,545,110 B2 * | 6/2009 | Williams et al. ........... 318/254.1 |

(Continued)

FOREIGN PATENT DOCUMENTS

| EP | 1133049 A1 | 9/2001 |
| WO | 2004023639 A1 | 3/2004 |
| WO | 2009136381 A2 | 11/2009 |

OTHER PUBLICATIONS

Intellectual Search Report under Section 17 for Application No. GB 1004049.1 dated Jul. 7, 2010.

(Continued)

*Primary Examiner* — David S Luo
(74) *Attorney, Agent, or Firm* — MacMillan, Sobanski & Todd, LLC

(57) ABSTRACT

A drive system, for a multi-phase brushless electric motor comprising a plurality of phases, comprises: a drive circuit including switch means arranged to vary the phase voltage applied to each of the phases so as to switch the motor between a plurality of active states; and control means. The control means is arranged to control the switch means so as to provide PWM control of the phase voltages to control the mechanical output of the motor. The control means is arranged to define a sequence for all of the active states and, for each PWM period, to allocate state times for the states required for that period to generate a desired net voltage, and to order the required states in the same order as they occur in the sequence.

25 Claims, 9 Drawing Sheets

(56) References Cited

U.S. PATENT DOCUMENTS

2008/0079377 A1    4/2008    Williams et al.
2008/0094023 A1    4/2008    West et al.
2009/0230913 A1    9/2009    Hiti et al.

OTHER PUBLICATIONS

International Search Report for PCT/GB2011/050281 dated Jul. 5, 2012.

* cited by examiner

▓ Zero time allocated to +/- U vector
▒ Zero time allocated to +/- V vector
░ Zero time allocated to +/- W vector

ELECTRIC MOTOR CONTROL

CROSS-REFERENCE TO RELATED APPLICATIONS

This application is a national stage of International Application No. PCT/GB2011/050281 filed Feb. 15, 2011, which claimed priority to Great Britain Patent Application No. GB 1004049.1 filed Mar. 11, 2010, the disclosures of which are incorporated herein by reference in entirety.

BACKGROUND OF THE INVENTION

This invention relates to electric motor control, and in particular to pulse width modulation (PWM) control of multiple phase brushless motors.

WO 2004/023639 describes a low-acoustic-noise low-speed position sensorless algorithm which uses measurements of the instantaneous rate of change of phase current (di/dt) within a PWM period to estimate rotor position down to zero speed. The algorithm shifts the edges of the PWM pattern to ensure that the necessary inverter states are available for the required amount of time to measure the rate of change of current in the required phase and under the required voltage excitation condition. By shifting the PWM edges in this way the acoustic noise created by the sensorless algorithm is kept to a minimum. The di/dt signal can be measured in any one of the eight inverter states.

WO 2004/023639 and PCT/IB2009/051914 describe several different ways to combine di/dt measurements from different inverter states to provide an estimate of position. Different combinations have different advantages such as immunity to temperature variation, magnitude of available voltage for controlling motor torque, acoustic noise, position estimate accuracy and so on. The two patents mentioned only use combinations of di/dt measurements using some or all of the six non-zero inverter states. However, the academic literature also describes techniques that use at least on of the two zero inverter states.

BRIEF SUMMARY OF THE INVENTION

The present invention provides a drive system for a multi-phase brushless electric motor comprising a plurality of phases, the system comprising a drive circuit including switch means. The switch means may be arranged to vary the phase voltage applied to each of the phases so as to switch the motor between a plurality of active states. The system may further comprise control means arranged to control the switch means so as to provide PWM control of the phase voltages, for example to control the mechanical output of the motor. The control means may be arranged to define a sequence for all of the active states. The control means may be arranged, for each PWM period, to allocate state times for the states required for that period, and to order the required states in the same order as they occur in the sequence. The sequence may be fixed, for example over a range of one or more operating parameters of the motor, such as a range of motor speeds, or a range of modulation index. Therefore the order of the states may be fixed over that range of operating parameters.

The control means may be arranged to control the switch means so that all of the active states occur in each of the PWM periods. Alternatively the control means may be arranged to allow any combination of active states, but to order the states in the period in the same order as they occur in the sequence.

The control means may be arranged, for each PWM period, to identify which of the states are required states and to allocate state times to those states. For example the required states may be required to generate the desired net voltage, or to enable sensing, such as current sensing, which may be for current measurement or for motor position measurement. What states are required will depend on the control algorithm that it being used.

The control means may be arranged to determine a set of state times having zero net voltage. These may include all of the active states not otherwise required. The set of state times may be selected so as to reduce the differences in length between the state times. For example, the control means may be arranged to define a measure of the differences in length between the state times, and to select the set of state times so as to reduce the measure of the differences.

The control means may be arranged to use the defined sequence for all desired net voltages within a predetermined range of magnitudes of the desired net voltage. The range of magnitudes may include all net voltages having a modulation index below a predetermined maximum.

Other advantages of this invention will become apparent to those skilled in the art from the following detailed description of the preferred embodiments, when read in light of the accompanying drawings.

BRIEF DESCRIPTION OF THE DRAWINGS

FIG. 5b is a diagram showing how the three phase inductances of the motor vary with electrical position during operation according to FIG. 5a;

FIG. 6b is a diagram showing how the three phase inductances of the motor vary with electrical position during operation according to FIG. 6a;

FIG. 7b is a diagram showing how the three phase inductances of the motor vary with electrical position during operation according to FIG. 7a;

DETAILED DESCRIPTION OF THE INVENTION

Figure 1:
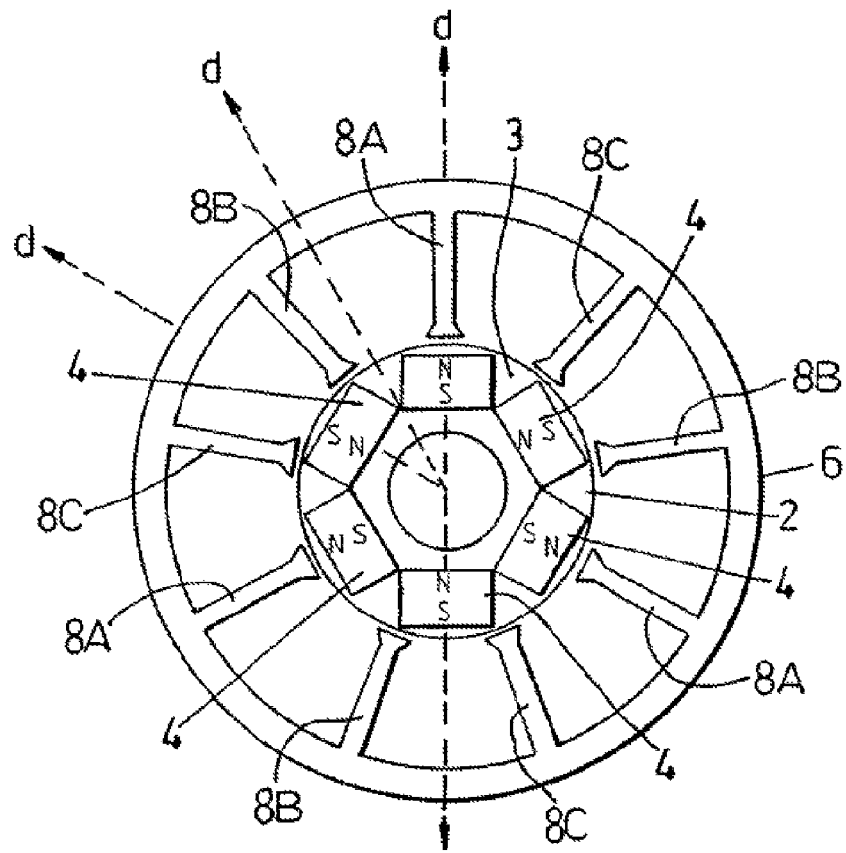
FIG. 1 is a diagram of an electric motor.

Referring to FIG. 1 a three phase brushless motor 1 by way of example is provided which comprises a rotor 2 having for example six embedded magnets 4 within it which in this instance are arranged so as to provide six poles which alternate between north and south around the rotor. The rotor therefore defines three direct or d axes evenly spaced around the rotor and three quadrature or q axes interspaced between the d axes. The d axes are aligned with the magnetic poles of the magnets 4 where the lines of magnetic flux from the rotor are in the radial direction, and the q axes are spaced between the d axes where the lines of magnetic flux from the rotor are in the tangential direction.

A stator 6 comprises a nine slot copper wound element having three groups of three teeth 8A, 8B, 8C each group of teeth having a common winding forming a respective phase. There are therefore three electrical cycles in each full rotation of the rotor, and the three teeth 8A, 8B, 8C in any phase are always in the same electrical position as each other.

In other embodiments other motor designs can be used, for example 12 tooth on the stator and 8 magnets on the rotor.

Figure 2:
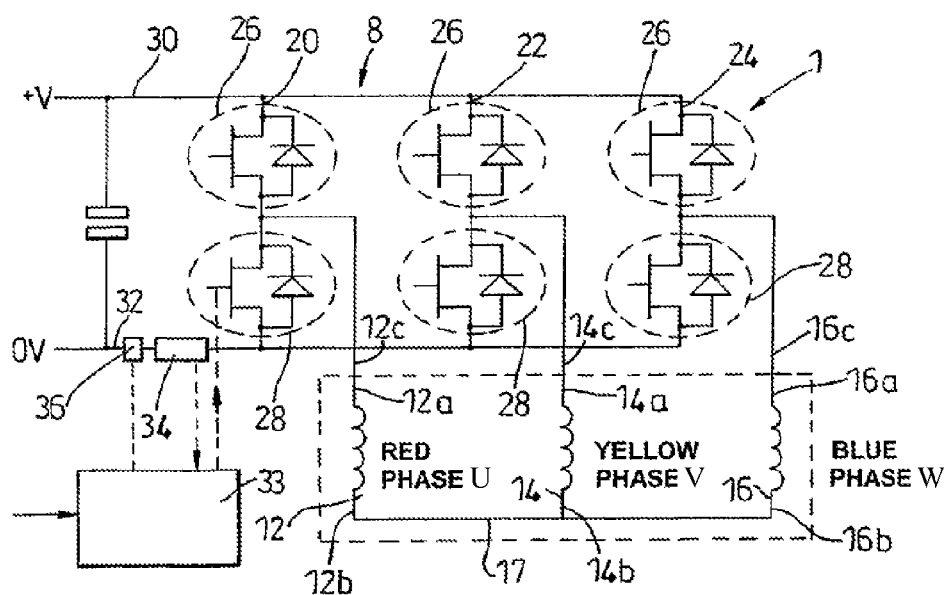
FIG. 2 is a diagram of a control system according to an embodiment of the invention for the motor of FIG. 1.

Referring to FIG. 2, the three motor windings 12, 14, 16, generally designated as phases U, V and W, are connected in a star network. The phase windings are coiled around the stator teeth 8A, 8B, 8C respectively. One end 12a, 14a, 16a of each coil is connected to a respective terminal 12c, 14c, 16c. The other ends 12b, 14b, 16b, of the coils are connected together to form the star centre 17. A drive circuit comprises a three phase bridge 18. Each arm 20, 22, 24 of the bridge comprises a pair of switches in the form of a top transistor 26 and a bottom transistor 28 connected in series between a supply rail 30 and ground line 32. The motor windings 12, 14, 16 are each tapped off from between a respective complementary pair of transistors 26, 28. The transistors 26, 28 are turned on and off in a controlled manner by a controller 33 to provide pulse width modulation of the potential applied to each of the terminals 12c, 14c, 16c, thereby to control the potential difference applied across each of the windings 12, 14, 16 and hence also the current flowing through the windings. This in turn controls the strength and orientation of the magnetic field produced by the windings.

A current measuring device in the form of a resistor 34 is provided in the ground line 32 between the motor 1 and ground so that the controller 33 can measure the total current flowing though all of the windings 12, 14, 16. In order to measure the current in each of the windings the total current has to be sampled at precise instants within the PWM period where the voltage applied to each terminal of the winding (and hence the conduction state of a particular phase) is known. A further sensor 36, which is a di/dt sensor arranged to measure rate of change of current, is provided in the ground line 32 in series with the current sensor 34. The di/dt sensor 36 is used to measure the inductance of the phases, and hence the position of the rotor as will be described below.

It will be appreciated from FIG. 1 that the inductance of the rotor 2 varies with electrical position because the air gap between the stator iron and rotor back iron varies with position, resulting in a variation of stator flux reluctance with rotor position.

Figure 3:
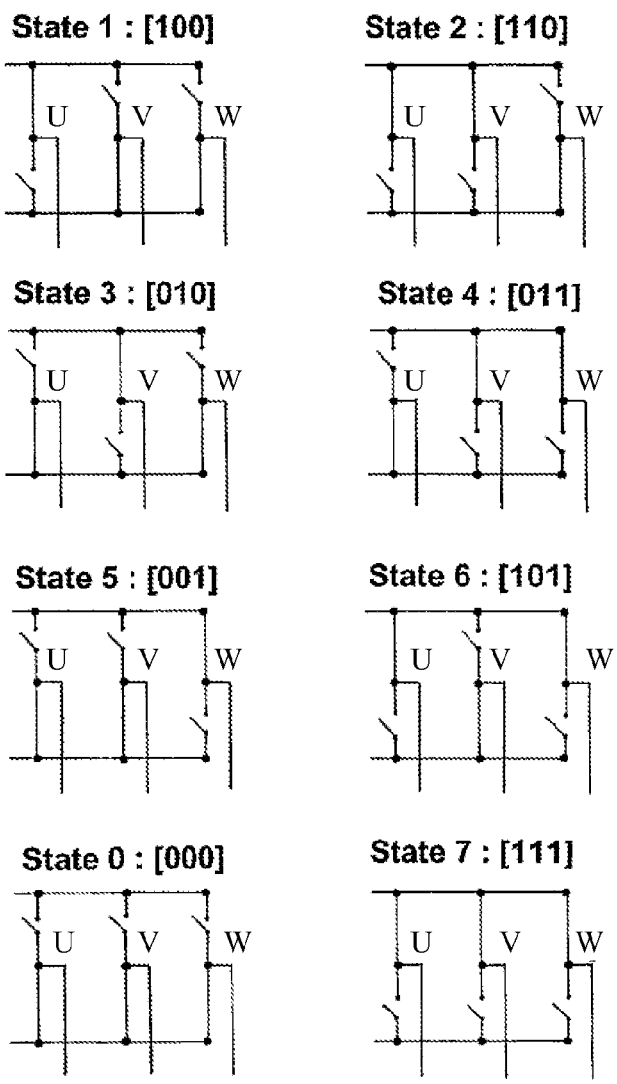
FIG. 3 is a diagram showing the various states of the motor of FIGS. 1 and 2.

Referring to FIG. 3, each winding 2, 4, 6 in a three phase system can only be connected to either the supply rail 20 or the ground line 22 and there are therefore eight possible states of the control circuit. Using 1 to represent one of the phases being at positive voltage and 0 to represent a phase connected to ground, state 1 can be represented as [100] indicating phase U at 1, phase V at 0 and phase W at 0, State 2 is represented as [110], state 3 as [010], state 4 as [011], state 5 as [001], state 6 as [101], state 0 as [000] and state 7 as [111]. Each of states 1 to 6 is a conducting state in which current flows through all of the windings 2, 4, 6, flowing in one direction through one of them and in the other direction through the other two. State 0 is a zero volt state in which all of the windings are connected to ground and state 7 is a zero volt state in which all the windings are connected to the supply rail.

States 1, 2, 3, 4, 5 and 6 are herein also referred to as states +U, −W, +V, −U, +W and −V respectively, because they each represent the states in which the voltage applied across the windings is in a positive or negative direction for a respective one of the phases. For example in the +U state the U phase is connected to the supply rail and the other two phases are connected to the ground link, and in the −U state the connections are reversed.

When the circuit is being controlled to produce pulse width modulation, each of the phases will normally be turned on and off once in each PWM period. The relative lengths of time that are taken up in each state will determine the magnitude and direction of the magnetic field produced in each winding, and hence the magnitude and direction of the total torque applied to the rotor. These lengths of time can be calculated by various modulation algorithms but in this embodiment a space vector modulation technique is used.

Figure 3A:
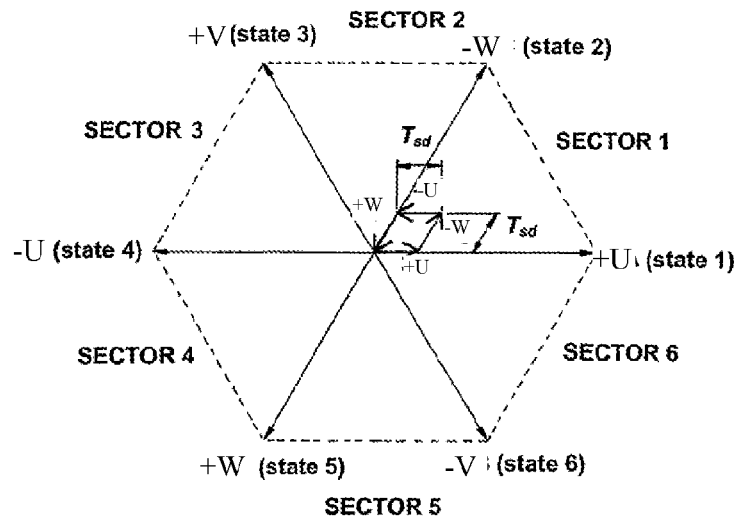
FIG. 3a is a state vector diagram used to illustrate operation of the control system of FIG. 2.

Referring to FIG. 3a, in state vector modulation systems, the times in each PWM period spent in each of the states are represented as state vectors in a state vector modulation (SVM) diagram. In this type of diagram, single state vectors are those in the directions of the vectors S1 to S6, and the length of the vectors in each of these directions represents the amount of time in each PWM period spent in the respective state. This means that any desired voltage in the windings can be represented as a point on the diagram which corresponds to a voltage vector which represents the magnitude and direction of the voltage, and can be produced by a combination of state vectors s1, s2, etc. the length of which represent the time in each PWM period spent in that state. Alternatively if certain states are required for other reasons, such as current measurement, a combination of states with zero net voltage can be used. For example the states shown in FIG. 3a include states +U, −W, −U, +W each for times $T_{sd}$ giving a zero net voltage and therefore zero net torque.

Figure 4A:
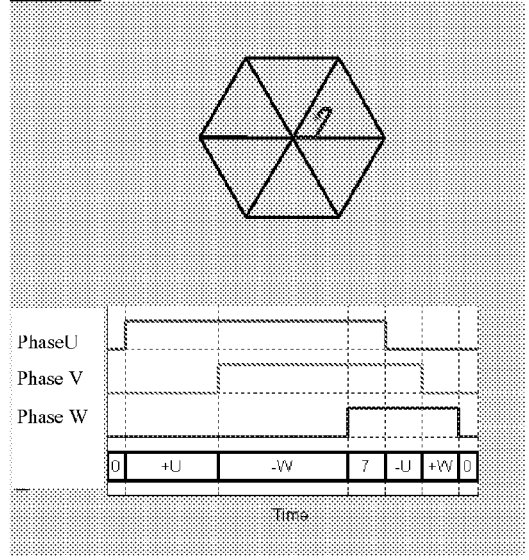
FIGS. 4a, 4b and 4c each comprise an SVM diagram and a PWM diagram showing a known method of operation of the system of FIG. 2.

Referring to FIG. 4a an example of a known PWM pattern for achieving a desired net voltage in sector 0 of the SVM diagram and allowing single sensor current measurement in phases U and W. The pattern includes state times for states +U and −W which are required to achieve the desired voltage. The +U and −W times required for the target net voltage are increased by a fixed length of time, the minimum state time, which is long enough for the rate of change of current to be measured. The pattern then includes state times −U and +W also of the minimum state time to cancel the extra time in the +U and −W states and allow the rate of change of current in the opposite direction to be measured. This gives a net voltage equal to the desired net voltage as well as allowing induction measurement in the U and W phases to be measured for position sensing. The remainder of the PWM period is filled with inactive states 0 and 7.

Figure 4B:
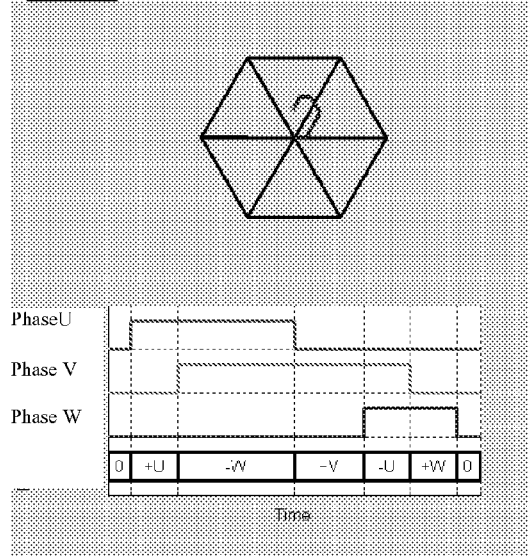

Referring to FIG. 4b, when the desired net voltage has rotated to sector 1 of the SVM diagram and current sensing in phases U and W is still required, the torque producing states times +V and −W required to generate the desired net voltage are calculated, then further minimum state times of +U, +W, −U and −W are added to allow the current sensing.

Figure 4C:
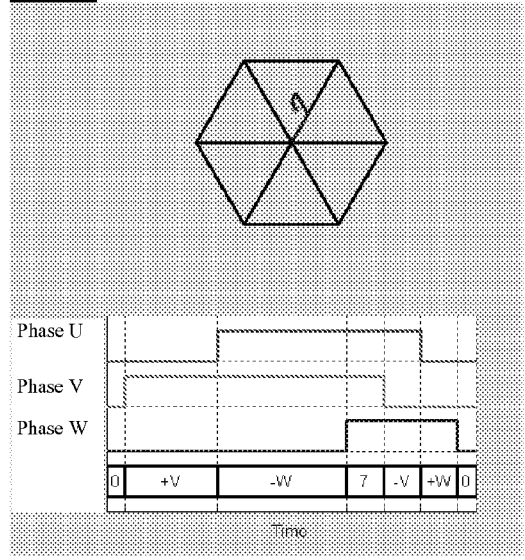

Referring to FIG. 4c, when the desired net voltage is still in sector 1 of the SVM diagram and current sensing in phases V and W is required, the torque producing states times +V and −W required to generate the desired net voltage are calculated, then further minimum state times of +V, +W, −V and −W are added to allow the current sensing.

Any of the three patterns described above could be used in a low-speed position-sensorless algorithm. It can be seen that as the sectors change the sequence of the inverter states also changes. For example, in FIG. 4a inverter state −U is preceded by state 7, whereas is FIG. 4b it is preceded by +V. Similarly, in FIG. 4b +W is preceded by −U, but in FIG. 4c it is preceded by −V. This change in sequence of vectors can cause problems for the sensorless algorithm. This is because in practice the value of the di/dt measurement in a particular inverter state for a given phase current vector, motor speed and velocity depends on which inverter state proceeds it. For instance, between the pattern in FIGS. 4b and 4c the total voltage demand vector is unchanged, which implies that the phase current vector and motor position and velocity are also identical in the two frames. However, the di/dt measurement for the +W state will be different between the two patterns because it is preceded by a +V in one and a −U in the other. This causes discontinuities in the di/dt signal that are not related to the motor position, and this can make it difficult to obtain a reliable position estimate as the rotor rotates.

Figure 5A:
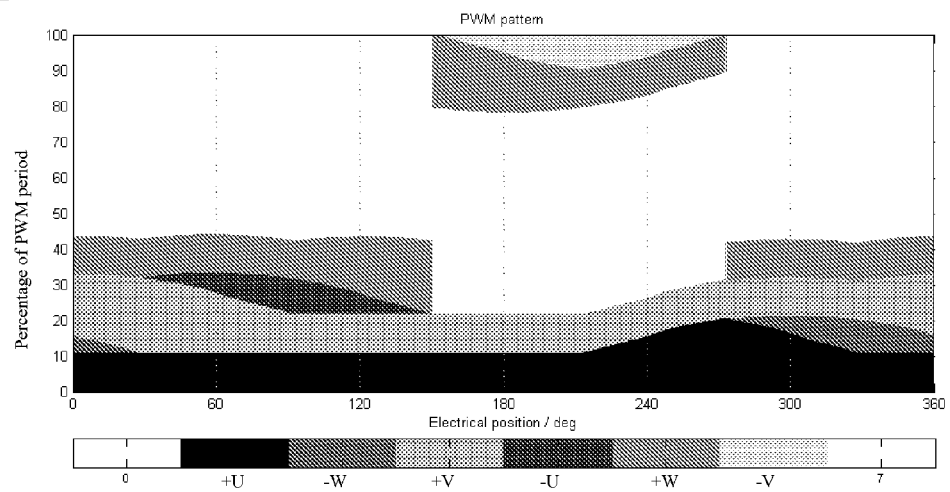
FIG. 5a is a diagram showing variation in the order of states with electrical position of the motor operating according to a known method.
Figure 5B:
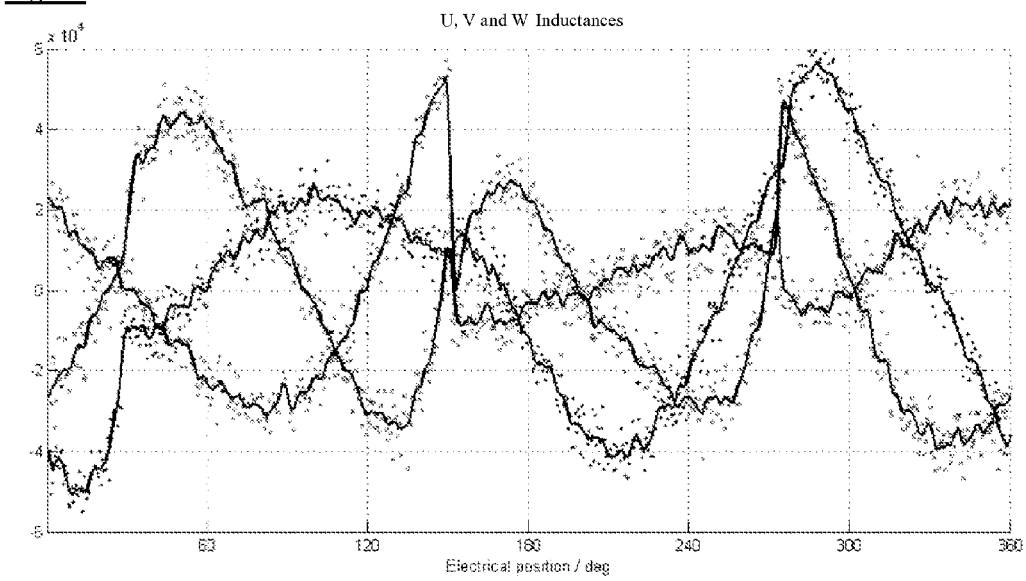

An example of the discontinuity in inductance measurement with changing state order using real measurement data is shown in FIGS. 5a and 5b. In FIG. 5a, the vertical axis is the percentage of the PWM period that is spent in each state, and the horizontal axis is the electrical position of the motor. As can be seen, at various points in the electrical cycle, the order of the states in the PWM period changes. FIG. 5b shows how the inductances of the three phases change over the same electrical cycle. Ideally the inductances would be expected to follow regular sine curves, but as can be seen these curves have marked discontinuities at the points in the cycle where the order of the states changes.

There are a number of reasons why the di/dt measurement in an inverter state may be affected by the inverter state that precedes it. For example, factors such as the settling time of the di/dt measurement circuitry and the inverter itself, crosstalk between the di/dt sensor channels and non-linearities in the di/dt measurement circuit could all be contributing factors to this phenomenon. Another possibility is that in a motor under conditions of high magnetic saturation (such as at rated load) the instantaneous magnetic flux pattern in the stator is determined by the sequence of inverter states. Thus the saturation point of the motor will be slightly different when the sequence of inverter states changes, even if the current vector and the position and velocity of the motor are unchanged. This in turn will lead to a different di/dt in a particular inverter state.

Figure 6A:
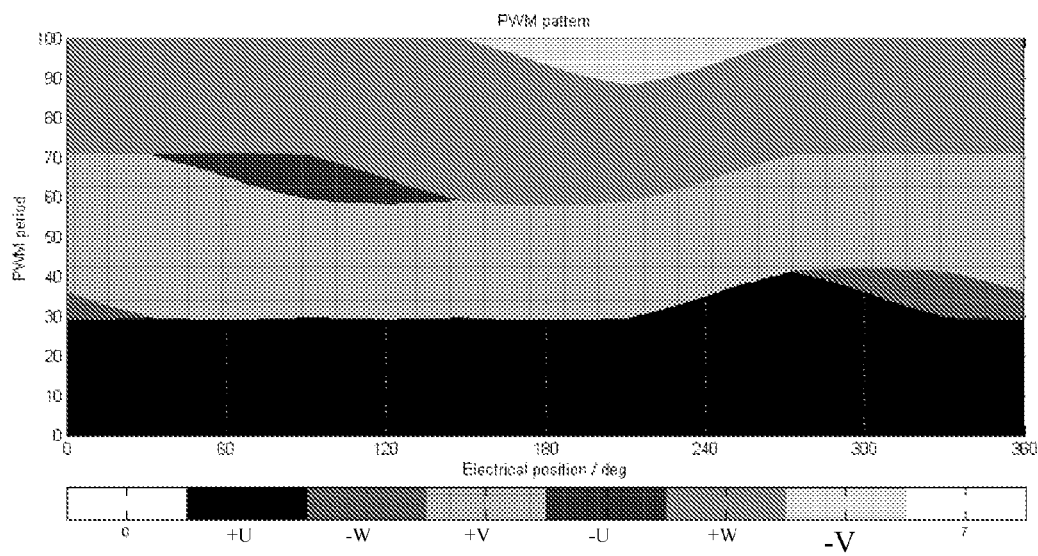
FIG. 6a is a diagram showing variation in the order of states with electrical position of the motor operating according to a first method according to the invention.
Figure 6B:
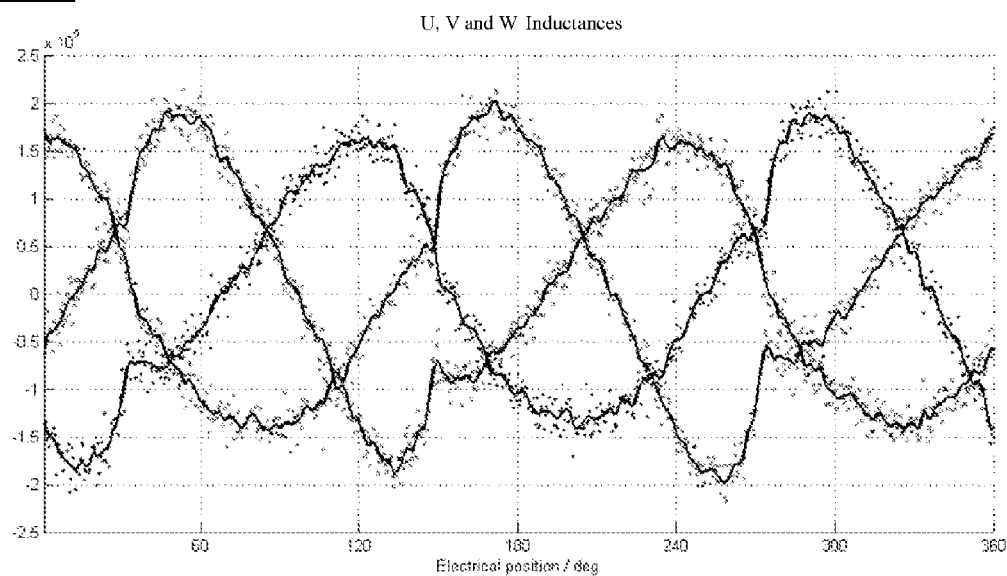

Referring to FIGS. 6a and 6b, in a first embodiment of the invention the algorithm is arranged to define a fixed sequence in which the six active states will occur, if present in any one PWM period. Then, for each, PWM period it is arranged to determine the desired net voltage, determine which active states are required, at for what lengths of time, to achieve that desired net voltage, and which active states are required for sensorless position measurement. Then when all the required active states and their state times for the period have been determined, the algorithm is arranged to determine how much of the PWM period is not allocated to required active states, and to allocate that to active states with zero net voltage. This is so that the whole of the PWM period is taken up with active states, and neither of the inactive states 0 or 7 is present. The zero net voltage states can be states that are among the required active states, or they can be other active states. Therefore, depending on which states are used for the zero net voltage states, any PWM period can contain up to the maximum number of active states, which in this case for a three phase motor is six. However in the example shown in FIG. 6b each PWM period contains either three or four states, the states varying with the electrical position of the motor.

Once all the active state times have been calculated, the algorithm is arranged to calculate a switching pattern that puts the active states in the order in which they appear in the fixed sequence. Any active states that are not required are simply omitted from the sequence. As can be seen from FIG. 6a, as the motor turns through one full electrical cycle, the states which are required change. For example the −U state starts to occur at about 30° and then stops occurring at about 150°, and the −W state starts to occur at 270° and stops occurring at about 30°. As can be seen from FIG. 6b, the resulting inductance curves are much smoother than those where re-ordering of the states is allowed, but there are still discontinuities in the inductance curves at, for example, 30° and 150° where one of the states starts to occur.

Figure 7A:
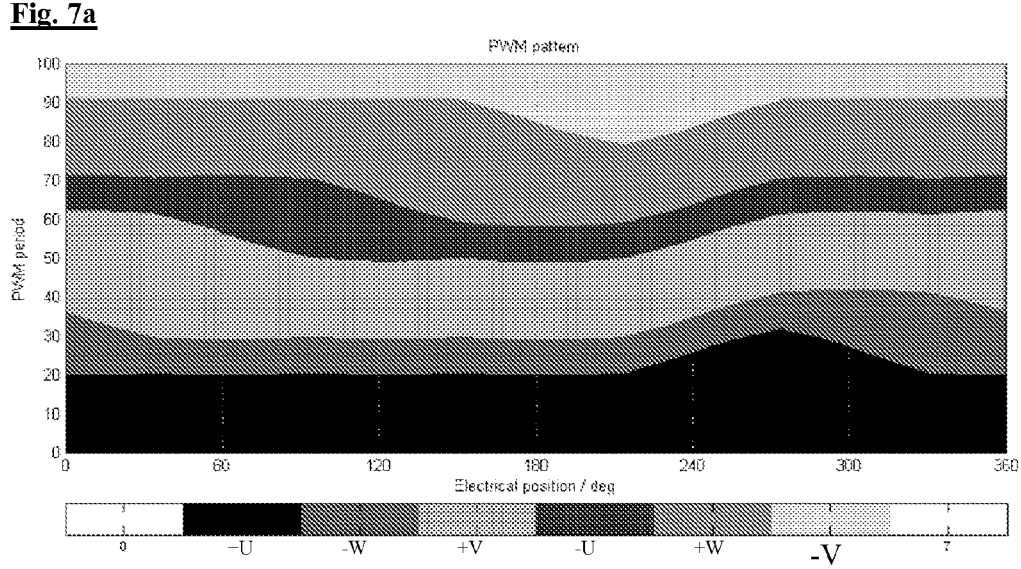
FIG. 7a is a diagram showing variation in the order of states with electrical position of the motor operating according to a second method according to the invention.
Figure 7B:
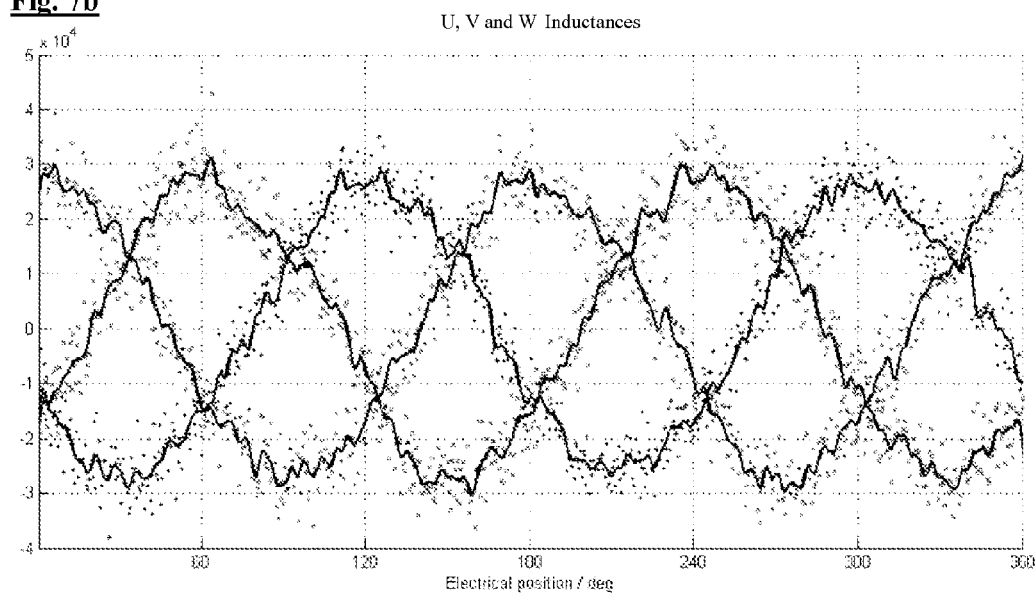

Referring to FIGS. 7a and 7b, in a second embodiment of the invention the algorithm is again arranged to define a fixed sequence in which the six active states will occur. However in this embodiment the algorithm is arranged to calculate the switching pattern so that all of the active state, and none of the inactive states, are present in each PWM period. Therefore, for each PWM period, it is arranged to determine the desired net voltage, determine which active states are required, for what lengths of time, to achieve that desired net voltage, and which active states are required for sensorless position measurement. Then when all the required active states and their state times for the period have been determined, the algorithm is arranged to determine how much of the PWM period is not allocated to required active states, and to allocate that to active states with zero net voltage. However in this case the zero net voltage states are chosen so as to include all of the states not otherwise required. This is so that the whole of the PWM period is taken up with active states, with all of the active states being present in each PWM period and always in the same order, and neither of the inactive states 0 or 7 is present. In this example each of the active states is present once and only once in each PWM period. As in the first embodiment, the zero net voltage states can be chosen in many ways, and can include two, three, four or six states. They can be states that are among the required active states, or they can be other active states, or they can be some of each.

Referring to FIG. 7b, the measured inductance curves of the three phases using this algorithm are much smoother than those of the first embodiment with no major discontinuities as there are no changes in the order of the active states, each state always being preceded by the same state in all PWM periods, and followed by the same state in all PWM periods.

Figure 8A:
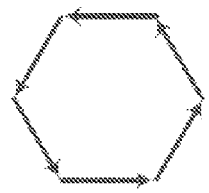
FIGS. 8a to 8f are parts of SVM diagrams showing different combinations of state times producing zero vector some voltages.
Figure 8B:
Figure 8C:
Figure 8D:
Figure 8E:
Figure 8F:
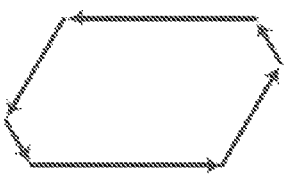

As described above, the zero net voltage states can be chosen in many ways, some examples of which are shown in FIGS. 8a to 8f. They can comprise equal times in each of the six active states as shown in FIG. 8a, or equal times in three states with zero net voltage, as shown in FIGS. 8b and 8c, or two equal times in opposite states, such as +U and −U, as shown in FIG. 8d, or two pairs of opposite states with the two states in each pair being of the same length, but the two pairs being of different lengths to each other, as shown in FIG. 8e, or of three equal and opposite pairs, the pairs again being of different lengths as shown in FIG. 8f.

Figure 9A:
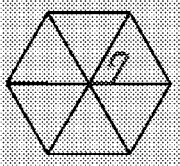
FIGS. 9a, 9b and 9c each comprise an SVM diagram and a PWM diagram showing the state times in a PWM period of the system of FIG. 2 operating according to the invention.
Figure 9B:
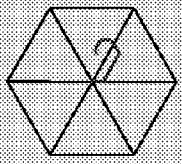
Figure 9C:
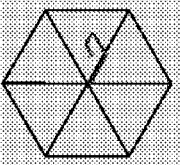

Referring to FIGS. 9a, 9b, and 9c, it will be appreciated that all desired net voltages up to a certain maximum modulation index, can be achieved, at the same time as allowing single sensor current measurement, whilst still using all available active states once each in the same order. In this example the order of the states is +U, −W, +V, −U, +W, −V. FIG. 9a shows a PWM pattern arranged to achieve a net voltage in sector 0 of the SVM diagram, with current sensing in phases U and W. State times in +U and −W are used which are longer than required for the desired net voltage, and coupled with shorter state times in the −U and +W states to enable the current sensing. Short and equal length state times in +V and −V are also provided which do not need to be sufficiently long for current sensing and which between them produce no net voltage. In FIG. 9b, a PWM pattern is shown in which the desired net voltage has moved into sector 1 of the SVM diagram and current sensing is still required in phases U and W. Reducing the +U and increasing the +V state times achieves this. In FIG. 9c a pattern is shown in which the desired net voltage is still in Sector 1, but current sensing is required in phases W and V. To achieve this the time in states +U and −U is reduced by an equal amount, giving no net change in voltage, and the times in states +V and −V is increased by an equal amount, again giving no net change in voltage but allowing current sensing in those states.

One possible algorithm for calculating the inverter state times in accordance with an embodiment of the invention is as described below. The inputs to this algorithm are the voltage demand vector that is required to produce the desired phase current vector to generate the desired motor torque; any phase current measurement states that may be needed (in single current sensor schemes only); and the di/dt measurement states that are needed to estimate phase inductance and hence motor position. The proposed algorithm comprises the following steps:

1. Identify in which phases current sensing is required and assign the di/dt measurement states to achieve that.
2. Where required (e.g. for some single current-sensor measurement schemes) assign the current measurement states.
3. Determine the demanded net voltage and assign the voltage demand states so that the total vector sum of the states from steps 1-3 equals the voltage demand vector.
4. Calculate the remaining time left until the end of the PWM period, which is the zero-state time. Split this time across some or all of the six inverter states so that the total length of the inverter states equals the PWM period. (Note that as explained above the vector sum of the allocated zero state time must be zero.)

Figure 10:
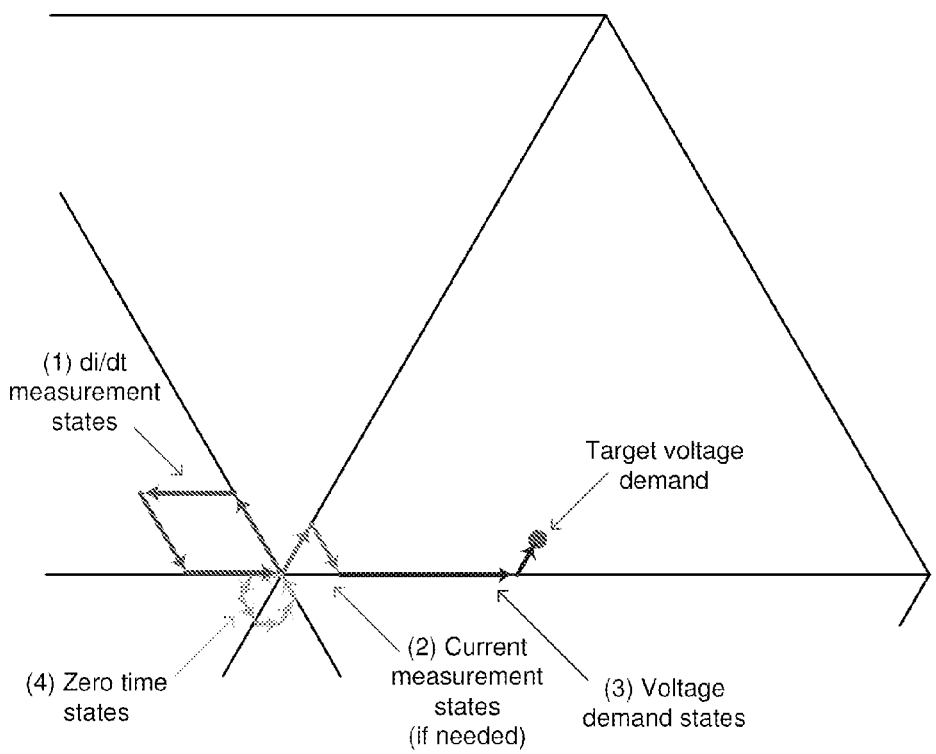
FIG. 10 is an SVM diagram illustrating an algorithm for allocating state times in the system of FIG. 2.

This algorithm is illustrated graphically in FIG. 10. It should be noted in FIG. 10 that the length of the state times is exaggerated so that their total is greater than the PWM period, whereas in fact the sum of the active state times always equals the PWM period in this embodiment.

Figure 11:
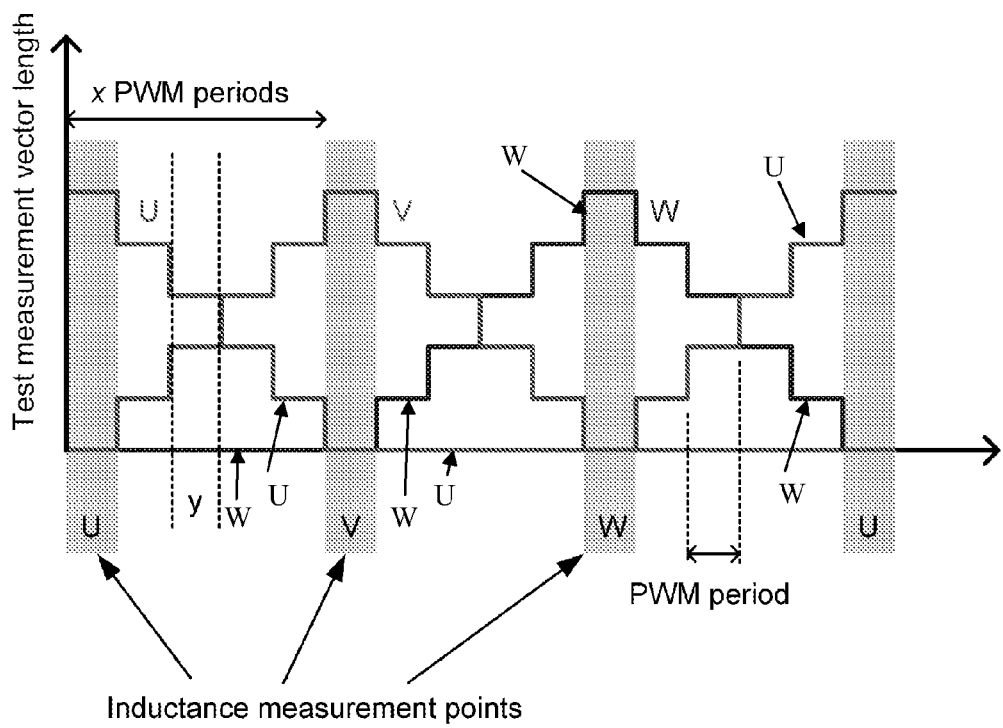
FIG. 11 is a diagram showing the length of U, V and W state times arranged to vary gradually between inductance measurement periods.

The ability to choose different combinations of vectors to allocate the zero state time gives an extra degree of freedom that can be used in some cases to minimise acoustic noise. For instance, patent application WO 2004/023639 shows how acoustic noise may be reduced by shifting the PWM edges from one state sequence to the next state sequence over several PWM periods. An example of this is illustrated in FIG. 11. This algorithm that measures the inductance of one phase at a time using pairs of positive and negative vectors; and measures a new phase every x PWM periods where x is an integer greater than 1, and in this case x=5. In this way the inductance of all three phases is known every 6x measurement periods. Provided this time is short enough, the rotor will not have moved appreciably in this time and so a reasonable estimate of motor position may be obtained. This process is described in more detail in WO 2004/023639.

The rapid edge movement from the state sequence for measuring one phase to the state sequence for measuring the next can cause acoustic noise, but this can be minimised by gradually shifting the PWM edges over the PWM periods in between the phase inductance measurements.

Figure 12:
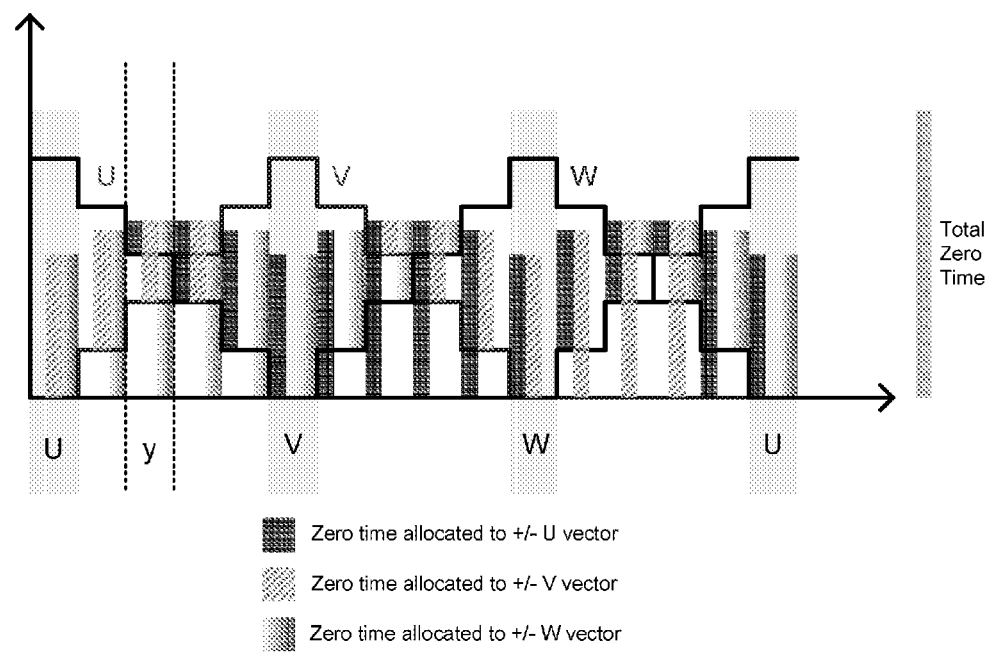
FIG. 12 is a diagram showing the length of zero-net-voltage time in each PWM period allocated to balanced voltages in each phase, in each or a series of PWM periods.

At low voltage demands the zero state time will be relatively large. This gives rise to the possibility of further acoustic noise reductions by careful choice of the allocation of the zero state time amongst the six available vectors. For example, at instance y in FIG. 11 the vector patterns are in an intermediate position between measuring the inductance in phase U and measuring the inductance in phase V. Hence phase U has the highest time allocated to measuring inductance, phase V has the second highest time and phase W has no time allocated to measuring inductance. The zero state time can now be allocated to minimise the difference between the length of the vectors of the three phases, for example by minimising the difference between the longest and the shortest state times in the PWM period, i.e. minimising the range of state times in the PWM period. Hence at position y, most zero state time will be allocated to phase W, the next most to phase V and a small amount to phase U as illustrated in FIG. 12. If the voltage demand is small enough, this will result in the lengths of the vectors in phases U, V and W being equal between inductance measurements and acoustic noise will be eliminated. For higher voltage demands there will be some shifting of vector lengths between inductance measurements, but the effect will be not be as great due to the reduced total zero time. Acoustic noise will be reduced, however.

Figure 13:
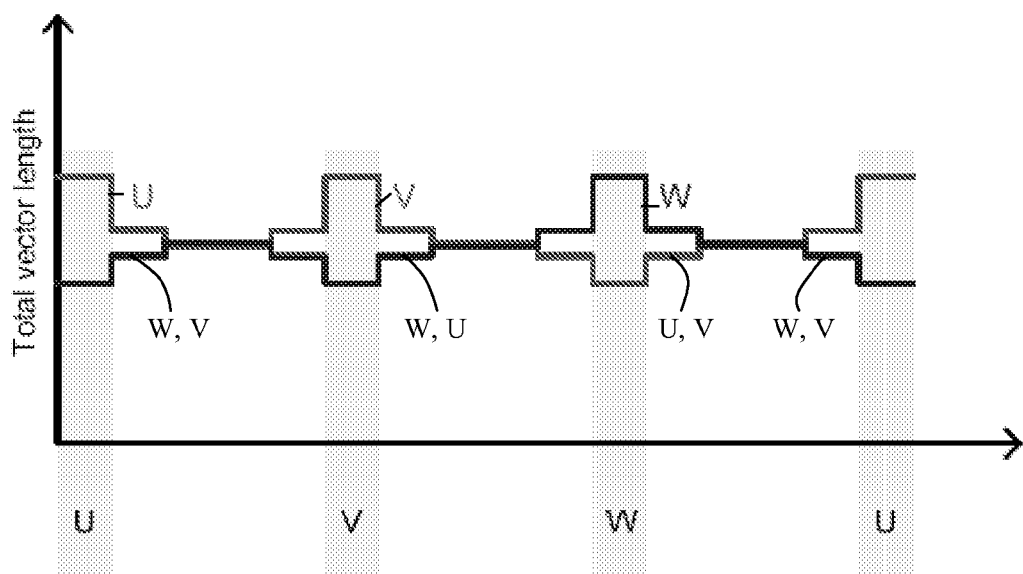
FIG. 13 is a diagram showing the resultant total time in each state in the PWM periods of FIG. 12.

FIG. 12 shows an example of allocating the available zero time to the different U, V and W. In the case shown there is not enough zero time to equalise all the state lengths but there is enough to reduce the step size caused by the test measurement vectors. FIG. 13 shows the resulting total vector lengths for each phase.

In applications that are sensitive to acoustic noise the acoustic noise for low voltage demands is usually the most important, and so this acoustic noise minimisation technique is particularly useful in these instances.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A drive system for a multi-phase brushless electric motor comprising a plurality of phases, said drive system comprising:
   a drive circuit including switch means arranged to vary a phase voltage applied to each of said phases so as to switch said motor between a plurality of active states, and
   control means arranged to control said switch means so as to provide PWM control of said phase voltages to control a mechanical output of said motor,
   wherein said control means is arranged to define a sequence for all of said active states in which states appear in an order and, said PWM control defining PWM periods, and for each of said PWM periods, to allocate state times for states required for said each period to generate a desired net voltage, and to order said required states in said order in which they occur in said sequence, wherein said control means is arranged, for each said PWM period, to identify which of said states are required states and to allocate state times to said required states, and wherein either (1) said required states include states required for motor position measurement, or (2) said control means is arranged to determine a set of state times having zero net voltage.

2. The drive system according to claim 1 wherein said control means is arranged to control said switch means so that all of said active states occur in each of said PWM periods.

3. The drive system according to claim 1 wherein said required states include states required to generate said desired net voltage.

4. The drive system according to claim 1 wherein said required states include states which are required for current measurement.

5. The drive system according to claim 1 wherein said required states include states required for motor position measurement.

6. The drive system according to claim 1 wherein said control means is arranged to determine a set of state times having zero net voltage.

7. The drive system according to claim 6 wherein said set of state times includes all of said active states not otherwise required.

8. The drive system according to claim 6 wherein said set of state times is selected so as to reduce differences in length between said state times.

9. The drive system according to claim 8 wherein said control means is arranged to define a measure of the differences in length between said state times, and to select said set of state times so as to reduce the measure of said differences.

10. The drive system according to claim 1 wherein said control means is arranged to use said defined sequence for all desired net voltages for all PWM periods when an operating parameter of said motor is within a predetermined range.

11. The drive system according to claim 1 wherein said control means is arranged to use said defined sequence for all desired net voltages within a predetermined range of magnitudes of said desired net voltage.

12. The drive system according to claim 11 wherein said range of magnitudes includes all net voltages having a modulation index below a predetermined maximum.

13. A drive system for a multi-phase brushless electric motor comprising a plurality of phases, said drive system comprising a drive circuit including switch means arranged to vary a phase voltage applied to each of said phases so as to switch said motor between a plurality of active states, and control means arranged to control said switch means so as to provide PWM control of said phase voltages to control a mechanical output of said motor, wherein said control means is arranged to define a sequence for all of said active states in which states appear in an order and, said PWM control defining PWM periods, and for each of said PWM periods, to allocate state times for states required for said each period to generate a desired net voltage, and to order said required states in said order in which they occur in said sequence, wherein said control means is arranged to use said defined sequence for all desired net voltages either (1) for all PWM periods when an operating parameter of said motor is within a predetermined range, or (2) within a predetermined range of magnitudes of said desired net voltage.

14. The drive system according to claim 13 wherein said control means is arranged to control said switch means so that all of said active states occur in each of said PWM periods.

15. The drive system according to claim 13 wherein said control means is arranged, for each said PWM period, to identify which of said states are required states and to allocate state times to said required states.

16. The drive system according to claim 15 wherein said required states include states required to generate said desired net voltage.

17. The drive system according to claim 15 wherein said required states include states which are required for current measurement.

18. The drive system according to claim 15 wherein said required states include states required for motor position measurement.

19. The drive system according to claim 15 wherein said control means is arranged to determine a set of state times having zero net voltage.

20. The drive system according to claim 19 wherein said set of state times includes all of said active states not otherwise required.

21. The drive system according to claim 19 wherein said set of state times is selected so as to reduce differences in length between said state times.

22. The drive system according to claim 21 wherein said control means is arranged to define a measure of the differences in length between said state times, and to select said set of state times so as to reduce the measure of said differences.

23. The drive system according to claim 13 wherein said control means is arranged to use said defined sequence for all desired net voltages for all PWM periods when an operating parameter of said motor is within a predetermined range.

24. The drive system according to claim 13 wherein said control means is arranged to use said defined sequence for all desired net voltages within a predetermined range of magnitudes of said desired net voltage.

25. The drive system according to claim 24 wherein said range of magnitudes includes all net voltages having a modulation index below a predetermined maximum.

* * * * *